United States Patent
Huang et al.

(10) Patent No.: US 10,361,594 B2
(45) Date of Patent: Jul. 23, 2019

(54) WIRELESS POWER TRANSMISSION DEVICE AND FOREIGN OBJECT DETECTION COIL THEREOF FOR DETECTING METALLIC FOREIGN OBJECT

(71) Applicant: Automotive Research & Testing Center, Changhua Hsien (TW)

(72) Inventors: Tzyy-Haw Huang, Changhua Hsien (TW); Chien-Chih Lu, Changhua Hsien (TW)

(73) Assignee: Automotive Research & Testing Center, Changhua Hsien (TW)

( * ) Notice: Subject to any disclaimer, the term of this patent is extended or adjusted under 35 U.S.C. 154(b) by 430 days.

(21) Appl. No.: 15/166,686

(22) Filed: Jun. 24, 2016

(65) Prior Publication Data

US 2017/0310166 A1    Oct. 26, 2017

(30) Foreign Application Priority Data

Apr. 25, 2016 (TW) .............................. 105112872 A

(51) Int. Cl.
| | |
|---|---|
| H02J 50/60 | (2016.01) |
| H02J 50/10 | (2016.01) |
| H01F 38/14 | (2006.01) |
| H02J 7/02 | (2016.01) |
| H02J 7/04 | (2006.01) |
| H01F 1/00 | (2006.01) |
| H01F 27/28 | (2006.01) |

(52) U.S. Cl.
CPC ............... *H02J 50/60* (2016.02); *H01F 1/00* (2013.01); *H01F 38/14* (2013.01); *H02J 7/025* (2013.01); *H02J 7/045* (2013.01); *H02J 50/10* (2016.02); *H01F 2027/2809* (2013.01)

(58) Field of Classification Search
None
See application file for complete search history.

(56) References Cited

U.S. PATENT DOCUMENTS

| 3,721,859 | A | * | 3/1973 | Blanyer | ................... B61L 1/10 246/249 |
| 4,255,711 | A | * | 3/1981 | Thompson | ............. G01V 3/107 324/329 |
| 4,292,589 | A | * | 9/1981 | Bonner | ................. E21B 47/082 324/221 |

(Continued)

*Primary Examiner* — Jared Fureman
*Assistant Examiner* — James P Evans
(74) *Attorney, Agent, or Firm* — C. G. Mersereau; DeWitt LLP

(57) ABSTRACT

A wireless power transmission device radiates electromagnetic waves through a transmission antenna and generates multiple sensed signals by using multiple foreign object detection (FOD) coils for detecting metallic foreign object to sense the electromagnetic waves. Each FOD coil has three coil units connected in series to and spaced apart from one another. The radiation pattern of the transmission antenna overlaps a sensing range of the FOD coils. A controller of the wireless power transmission device determines if any metallic foreign object enters the radiation range of the transmission antenna according to a reference voltage signal and sensed signals of the cells, and stops the generation of electromagnetic waves when determining entry of metallic foreign object into the radiation range to avoid the metallic foreign object to be heated by the electromagnetic waves.

10 Claims, 10 Drawing Sheets

(56) References Cited

U.S. PATENT DOCUMENTS

| | | | | |
|---|---|---|---|---|
| 5,065,099 A | * | 11/1991 | Sinclair | G01V 3/28 |
| | | | | 324/339 |
| 2007/0052420 A1 | * | 3/2007 | Speck | G01R 33/3875 |
| | | | | 324/320 |
| 2008/0262584 A1 | * | 10/2008 | Bottomley | A61N 1/05 |
| | | | | 607/119 |
| 2010/0176659 A1 | * | 7/2010 | Aoyama | H02J 7/025 |
| | | | | 307/104 |
| 2011/0158057 A1 | * | 6/2011 | Brewer | G04C 17/00 |
| | | | | 368/239 |
| 2011/0304328 A1 | * | 12/2011 | Yamamoto | G01N 27/9033 |
| | | | | 324/240 |
| 2013/0241300 A1 | * | 9/2013 | Miyamoto | H01F 5/003 |
| | | | | 307/104 |
| 2014/0176274 A1 | * | 6/2014 | Chiang | H01F 38/14 |
| | | | | 336/170 |
| 2015/0054355 A1 | * | 2/2015 | Ben-Shalom | H04B 5/0037 |
| | | | | 307/104 |
| 2015/0145343 A1 | * | 5/2015 | Chiyo | H01F 27/38 |
| | | | | 307/104 |
| 2015/0145530 A1 | * | 5/2015 | Urano | H01F 27/402 |
| | | | | 324/655 |
| 2015/0244175 A1 | * | 8/2015 | Abe | H02J 7/0042 |
| | | | | 307/104 |
| 2016/0241064 A1 | * | 8/2016 | Hatakeyama | H02J 17/00 |
| 2016/0282500 A1 | * | 9/2016 | Filippenko | G01V 3/104 |
| 2016/0336759 A1 | * | 11/2016 | Yamamoto | H02J 50/60 |
| 2018/0172785 A1 | * | 6/2018 | Leussler | G01R 33/288 |

\* cited by examiner

US 10,361,594 B2

WIRELESS POWER TRANSMISSION DEVICE AND FOREIGN OBJECT DETECTION COIL THEREOF FOR DETECTING METALLIC FOREIGN OBJECT

BACKGROUND OF THE INVENTION

1. Field of the Invention

The present invention relates to a wireless power transmission device and a coil thereof and, more particularly, to a wireless power transmission device capable of detecting metallic foreign object and multiple foreign object detection (FOD) coils thereof for detecting metallic foreign object.

2. Description of the Related Art

A conventional wireless power transmission device basically includes an AC (Alternating Current) to DC (Direct Current) converter, a DC to AC converter and a transmission antenna. An input terminal of the AC to DC converter is used to receive an AC power from mains power. The AC to DC converter converts the AC power into a DC power. The DC to AC converter receives the DC power and converts the DC power into an AC output power. In collaboration with the transmission antenna, the DC to AC converter transmits the AC output power out in the form of electromagnetic waves. Thus, a receiving device with wireless charging functions receives the electromagnetic waves transmitted from the transmission antenna, and converts the electromagnetic waves into a charging power to charge the receiving device in completion of a wireless charging process.

When metallic foreign object enters a range of the electromagnetic waves generated by the wireless power transmission device, the metallic foreign object generates high heat under the effect of electromagnetic field to result in a hazardous situation. Hence, current wireless power transmission devices are capable of detecting metallic foreign object, and the detection techniques of metallic foreign object are adopted to directly measure parameters of electromagnetic waves generated by the transmission antenna, such as power dissipation, efficiency, S-parameters, quality factor and the like. Whether any metallic foreign object enters the range of the electromagnetic waves generated by the current wireless power transmission devices is determined by variation of the parameters of electromagnetic waves.

However, measurement of those parameters is susceptible to a transmission distance of electromagnetic waves. Especially when the size of the metallic foreign object is smaller than that of the transmission antenna, it is difficult to determine if there is ally metallic foreign object entering the range of the electromagnetic waves generated by the current wireless power transmission devices.

SUMMARY OF THE INVENTION

An objective of the present invention is to provide a wireless power transmission device and an FOD coil thereof for detecting metallic foreign object for the purpose of effectively detecting the presence of metallic foreign object between the wireless power transmission device and a power receiving device.

To achieve the foregoing objective, the wireless power transmission device includes an alternating current (AC) to direct current (DC) converter, a DC to AC converter, multiple FOD coils, a reference voltage generation circuit, multiple feedback detection circuits and a controller.

The AC to DC converter has an input terminal to receive an AC power and convert the AC power into a DC power.

The DC to AC converter has an input terminal and multiple compensation capacitors.

The input terminal is electrically connected to an output terminal of the AC to DC converter to convert the DC power into an AC output power.

The multiple compensation capacitors are electrically connected to a transmission antenna to transmit the AC output power in the form of electromagnetic waves through the transmission antenna.

The multiple FOD coils for detecting metallic foreign object are mounted on an insulating substrate to sense the electromagnetic waves and generate multiple sensed signals. Each FOD coil has three coil unit connected in series to and spaced apart from one another. A radiation pattern of the transmission antenna overlaps a sensing range of the FOD coils.

The reference voltage generation circuit has an input terminal electrically connected to the multiple compensation capacitors of the DC to AC converter to receive terminal voltages of any one of the multiple compensation capacitors and generate a reference voltage signal according to the terminal voltages of the compensation capacitor.

The multiple feedback detection circuits are electrically connected to the respective FOD coils. Each feedback detection circuit receives the sensed signal of a corresponding FOD coil.

The controller is electrically connected to the reference voltage generation circuit and the multiple feedback detection circuits to receive the reference voltage signal and the sensed signals corresponding to the multiple FOD coils and determine if any metallic foreign object enter a range of electromagnetic waves generated by the transmission antenna according to the reference voltage signal and the sensed signals.

To achieve the foregoing objective, the FOD coil for detecting metallic foreign object is formed on an insulating substrate, and includes three coil units connected in series to and spaced apart from one another Given three coil units connected in series to and spaced apart from one another, the FOD coil for detecting metallic foreign object can provide a uniform electromagnetic field sensing capability in a sensing space. Additionally, in contrast to parameters of the transmission antenna in conventional wireless power transmission devices, the present invention implements a radiation pattern of the transmission antenna to overlap the sensing range of the FOD coils by the approach using the FOD coils smaller than the size of a transmission antenna with each FOD coil having its own sensing region. Accordingly, any metallic foreign object smaller than the size of the transmission antenna can be effectively detected, and after detection of the metallic foreign object, the controller immediately stop radiation of the transmission antenna to prevent the metallic foreign object from being over-heated.

Other objectives, advantages and novel features of the invention will become more apparent from the following detailed description when taken in conjunction with the accompanying drawings.

DETAILED DESCRIPTION OF THE INVENTION

Figure 1:
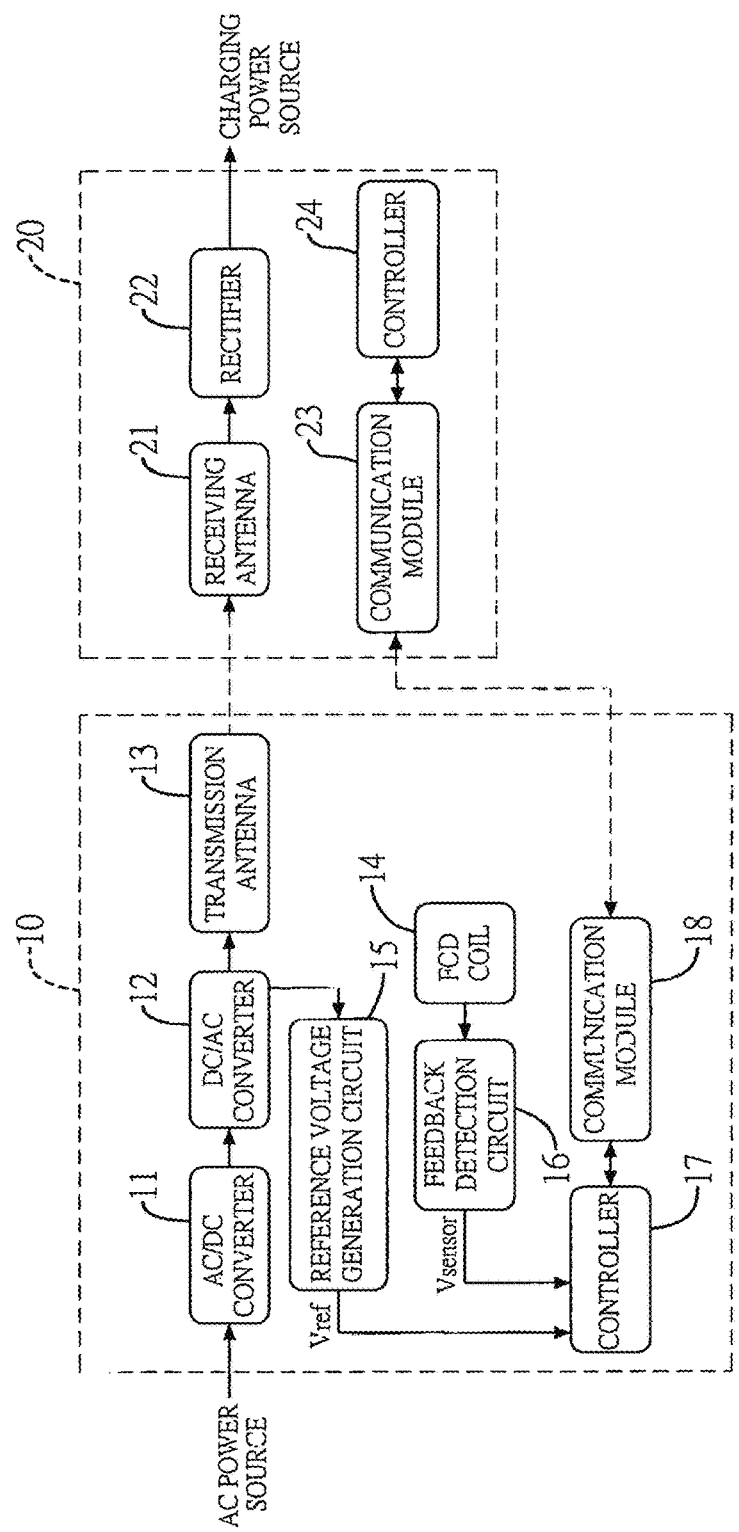
FIG. 1 is a functional block diagram of a wireless power transmission device in accordance with the present invention.
Figure 2:
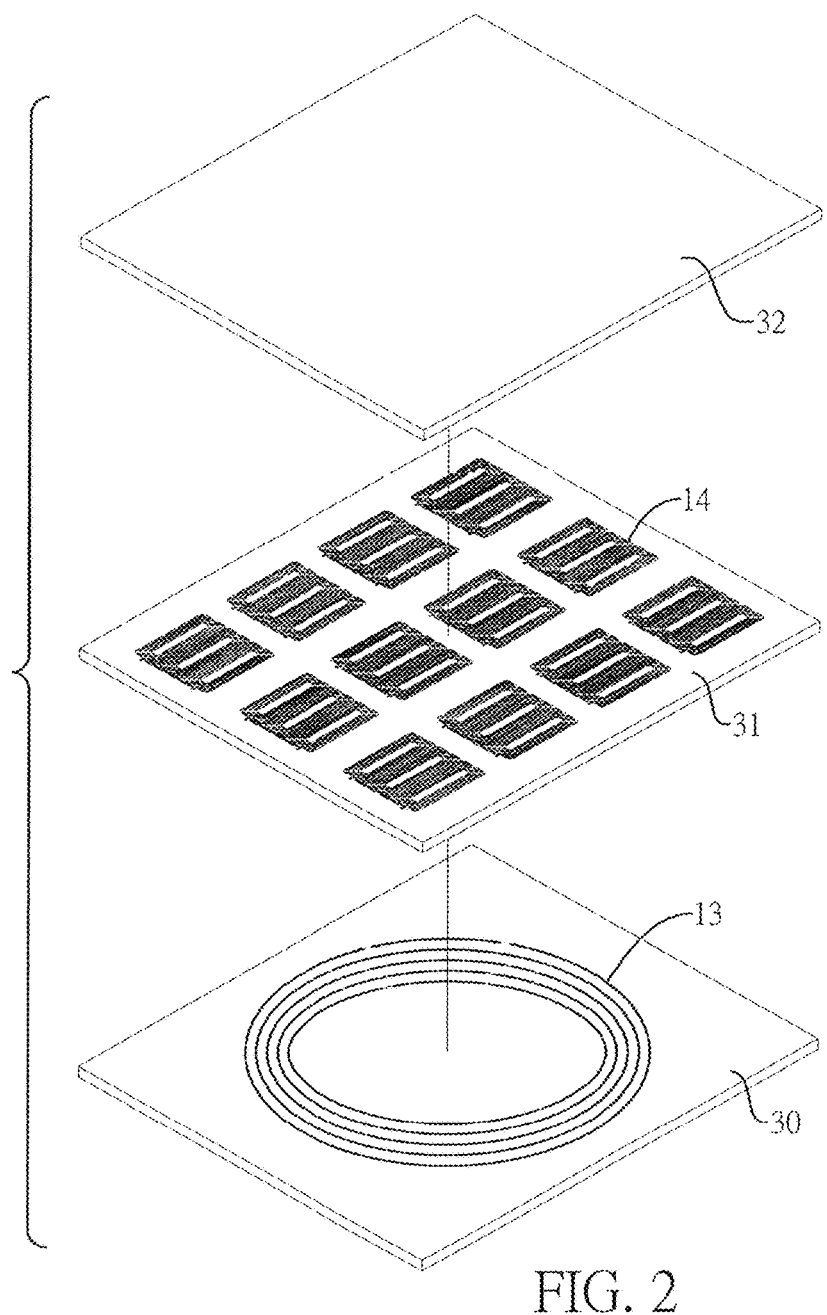
FIG. 2 is an exploded perspective view of the wireless power transmission device in FIG. 1, including an enclosure, a transmission antenna mounted on a first insulating substrate, and an FOD coil for detecting metallic foreign object.
Figure 3:
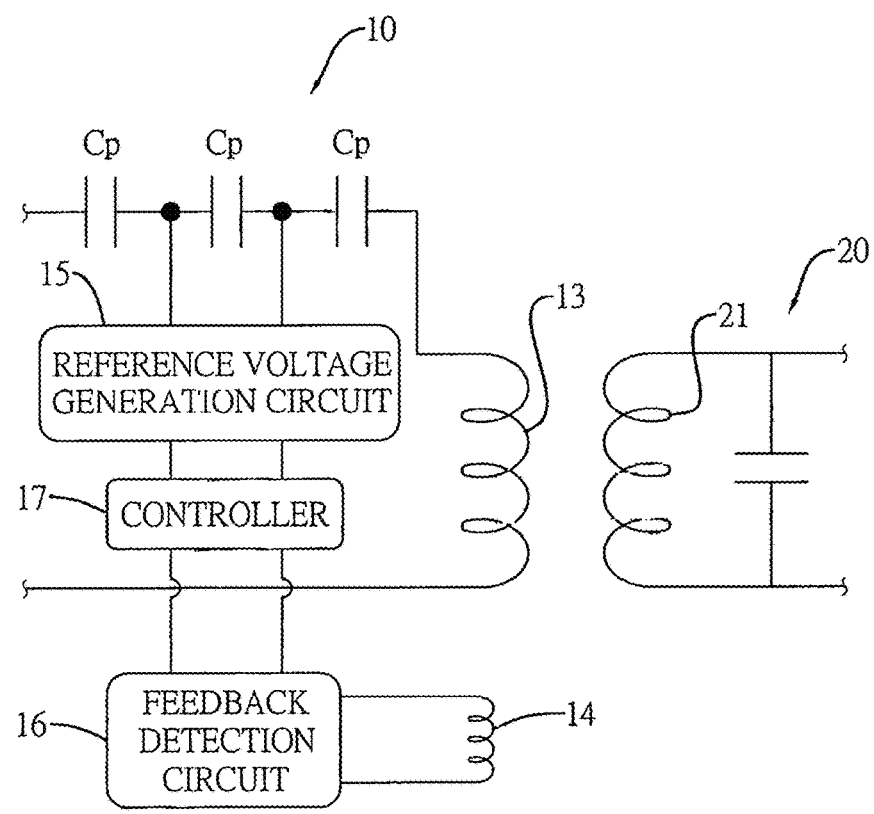
FIG. 3 is a partial circuit diagram of the wireless power transmission device in FIG. 1.

With reference to FIGS. 1 to 3, a wireless power transmission device 10 includes an AC (Alternating Current) to DC (Direct Current) converter 11, a DC to AC converter 12, a transmission antenna 13, multiple foreign object detection (FOD) coils for detecting metallic foreign object 14, a reference voltage generation circuit 15, multiple feedback detection circuits 16 and a controller 17.

An input terminal of the AC to DC converter 11 serves to receive an AC power, such as an AC power supplied by mains power, and converts the AC power into a DC power. An input terminal of the DC to AC converter 12 is electrically connected to an output terminal of the AC to DC converter 12 to receive the DC power and converts the DC power into an AC output power. An output terminal of the DC to AC converter 12 is electrically connected to the transmission antenna 13 to transmit the AC output power in the form of electromagnetic radiation through the transmission antenna 13.

With reference to FIG. 2, the transmission antenna 13 is mounted on a surface of a first insulating substrate 30. The multiple FOD coils for detecting metallic foreign object are mounted on a surface of a second insulating substrate 31 in the form of a matrix. The second insulating substrate 31 is mounted on the transmission antenna 13 for the multiple FOD coils for detecting metallic foreign object to be located above the transmission antenna 13, such that a radiation pattern of the transmission antenna 13 overlaps a sensing range of the FOD coils 14, and the FOD coils 14 and the transmission antenna 13 are separated by the second insulating substrate 31. An enclosure 32 is further mounted on the second insulating substrate 31 to cover the second insulating substrate 31 and prevent the FOD coils 14 from being exposed. Electromagnetic waves radiated by the transmission antenna 13 can penetrate the second insulating substrate 31 and the enclosure 32.

A receiving device 20, which is a device to be charged, can be placed outside the enclosure 32. With reference to FIG. 1, the receiving device 20 includes a receiving antenna 21, a rectifier 22, a communication module 23 and a controller 24. When the receiving antenna 21 senses the electromagnetic waves transmitted from the transmission antenna 13 to generate a sensing power, the rectifier 21 22 converts the sensing power into a DC charging power. When the transmission antenna 13 transmits electromagnetic waves out, because all FOD coils 14 are located within a radiation range of the electromagnetic waves, each FOD coil 14 can sense the electromagnetic waves to generate a sensed signal Vsensor.

The FOD coil 14 is comprised of three coil units connected in series and spaced apart from each other. Such structure of the FOD coil 14 provides an even electromagnetic field sensing capability in a space to be sensed, which is an electromagnetic field sensing area of the three coil units.

Figure 5:
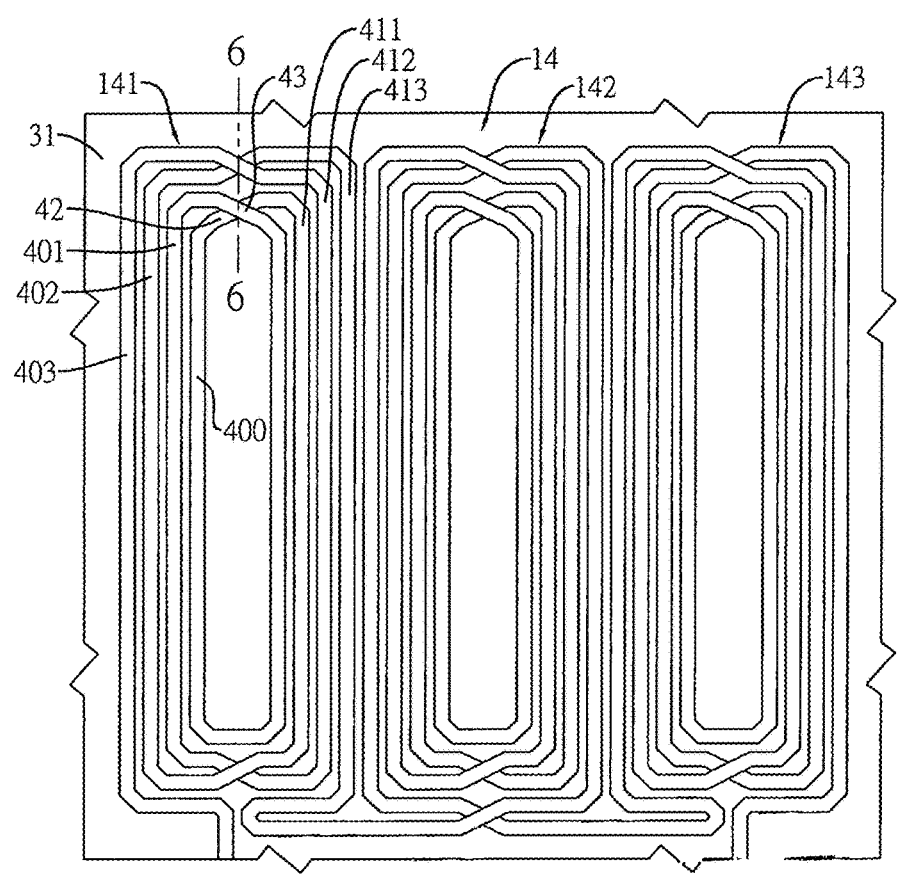
FIG. 5 is a schematic planar diagram showing a structure of a first embodiment of the FOD coil for detecting metallic foreign object in FIG. 3.

With reference to FIG. 5, a first embodiment of an FOD coil 14 in accordance with the present invention includes a first coil unit 141, a second coil unit 142 and a third coil unit 143. As an example, the first coil unit 141 includes a center segment 400, a first segment 401, a second segment 402, a third segment 403, a fourth segment 411, a fifth segment 412, a sixth segment 413, multiple connection segment 42 and multiple bridging segments 43.

Figure 6:
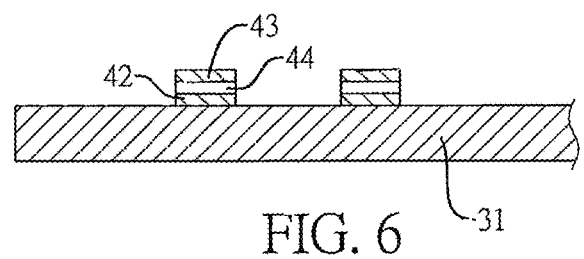
FIG. 6 is a schematic side view in partial section of the FOD coil in FIG. 5 taken along a line A-A.

Each of the center segment 400, the first to third segments 401~403 and the fourth to sixth segments 411~413 has two ends. The center segment 400 is mounted on a surface of the second insulating substrate 31, and is U-shaped. The first to third segments 401~403 are mounted on the surface of the second insulating substrate 31 and are sequentially arranged outwards on a side of the center segment 400. In other words, the first segment 401 is closest to the center segment 400. The fourth to six segments 411~413 are mounted on the surface of the second insulating substrate 31 and are sequentially arranged outwards on a side of the second insulating substrate 31 next to the center segment 400 and opposite to the side of the second insulating substrate 31 with the first to third segments 401~403. In other words, the fourth segment 411 is closest to the center segment 400. One end of the third segment 403 is a current output (or input) terminal, and the other end of the third segment 403 is electrically connected to one end of the fifth segment 412 through one of the bridging segment 43. The other end of the fifth segment 412 is electrically connected to one end of the center segment 401 through one of the connection segments 42. The other end of the first segment 401 is electrically connected to one end of the center segment 400 through another bridging segment 43. The other end of the center segment 400 is electrically connected to one end of the fourth segment 411 through another connection segment 42. The other end of the fourth segment 411 is electrically connected to one end of the second segment 402 through another bridging segment 43. The other end of the second segment 402 is electrically connected to the sixth segment 413 through another connection segment 42. The other end of the sixth segment 413 is electrically connected to the second coil unit 142 through another bridging segment 43. The structure of the second coil unit 142 and the third coil unit 143 can be deduced by analogy. With reference to FIG. 6, the multiple connection segments 42 are formed on the surface of the second insulating substrate 31, an insulation layer 44 is formed on the connection segments 42, and the bridging segments 42 are formed on the insulation layer 44, such that the bridging segments 43 and the connection segments 42 can be separated by the insulation layer 44 to avoid short-circuit caused by direct contact between the connection segments 42 and the bridging segments 43. Thus, the center segment 400, the first to third segments 401~403 and the fourth to sixth segments 411~413 are connected in series to one another through the connection segments 42 and the bridging segments 43 to form the FOD coil 14 with a winding structure.

Figure 7:
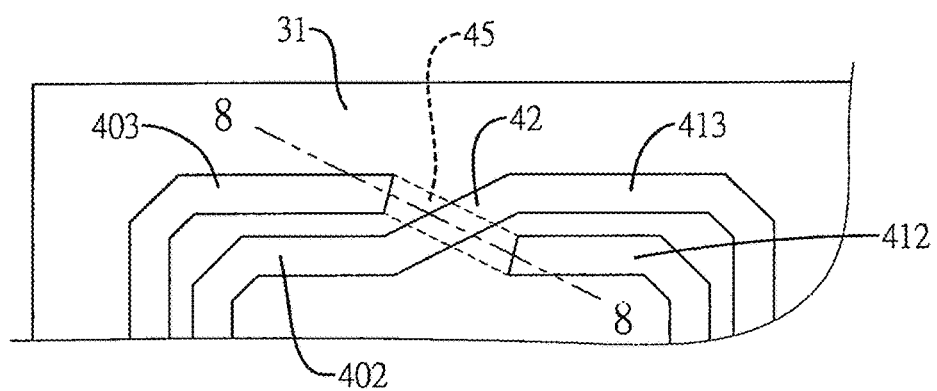
FIG. 7 is a partial schematic planar diagram showing a structure of the FOD coil in FIG. 5.
Figure 8:
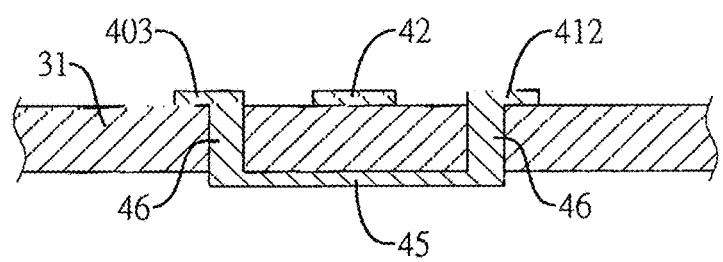
FIG. 8 is a schematic side view in partial section of the FOD coil in FIG. 7 taken along a line B-B.

With reference to FIGS. 7 and 8, the second insulating substrate 31 may be a double-sided printed circuit board (PCB) and has a top surface and a bottom surface. The center segment 400, the first to third segments 401~403, the fourth to sixth segments 411~413 and the connection segments 42 are formed on the top surface of the second insulating substrate 31. The bridging segments 45 are formed on the bottom surface of the second insulating substrate 31. Two ends of one of the bridging segments 45 respectively penetrate through two vias 46 formed through the second insulating substrate 31 to connect between the third segment 403 and the fifth segment 412.

Figure 9:
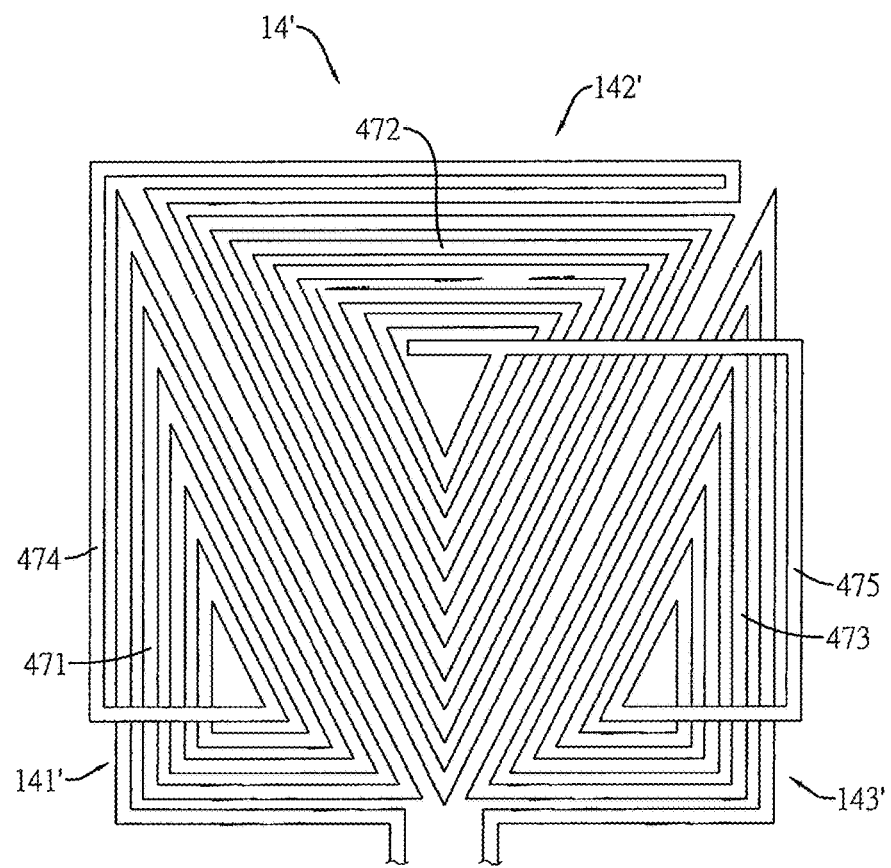
FIG. 9 is a schematic planar diagram showing a structure of a second embodiment of the FOD coil for detecting metallic foreign object in FIG. 3.

With reference to FIG. 9, a second embodiment of an FOD coil 14' in accordance with the present invention includes a first coil unit 141', a second coil unit 142' and a third coil unit 143'. The second coil unit 142' is formed by winding a second wire 472 to generate a coiled isosceles triangle with a first leg and a second leg, and has an inner end and an outer end. The first coil unit 141' is formed by winding a first wire 471 to generate a coiled right triangle with a hypotenuse. The hypotenuse of the first coil unit 141' is external and parallel to the first leg of the second coil unit 142'. The first coil unit 141' has an inner end and an outer end. The third coil unit 143' is formed by winding a third wire 473 to generate a coiled right triangle with a hypotenuse. The hypotenuse of the third coil unit 143' is external and parallel to the second leg of the second coil unit 142'. The third coil unit 143' has an inner end and an outer end. The first coil unit 141', the second coil unit 142' and the third coil unit 143' are spaced apart from one another and the first coil unit 141', the second coil unit 142' and the third coil unit 143' as a whole are rectangular. The inner end of the first coil unit 141' is connected to an outer end of the second coil unit 142' through a first connection segment 474. The inner end of the second coil unit 142' is connected to the inner end of the third coil unit 143' through a second connection segment 475. The outer end of the first coil unit 141' is a current input (or output) terminal. The outer end of the third coil unit 143' is a current output (or input) terminal. The outer end of the third coil unit 143' is a current output (or input) end. Similar to the first embodiment, the first and second connection segments 474, 475 may be formed above the first, second and third wires 471, 472, 473 with an insulation layer formed between the first and second connection segments 474, 475 and the first, second and third wires 471, 472, 473. The first, second and third wires 471, 472, 473 may be formed on a top surface of a double-sided PCB and the first and second connection segments 474, 475 are formed on a bottom surface of the double-sided PCB. The first and second connection segments 474, 475 penetrate through vias formed through the double-sided PCB to respectively connect to the first, second third wires 471, 472, 473.

Figure 10:
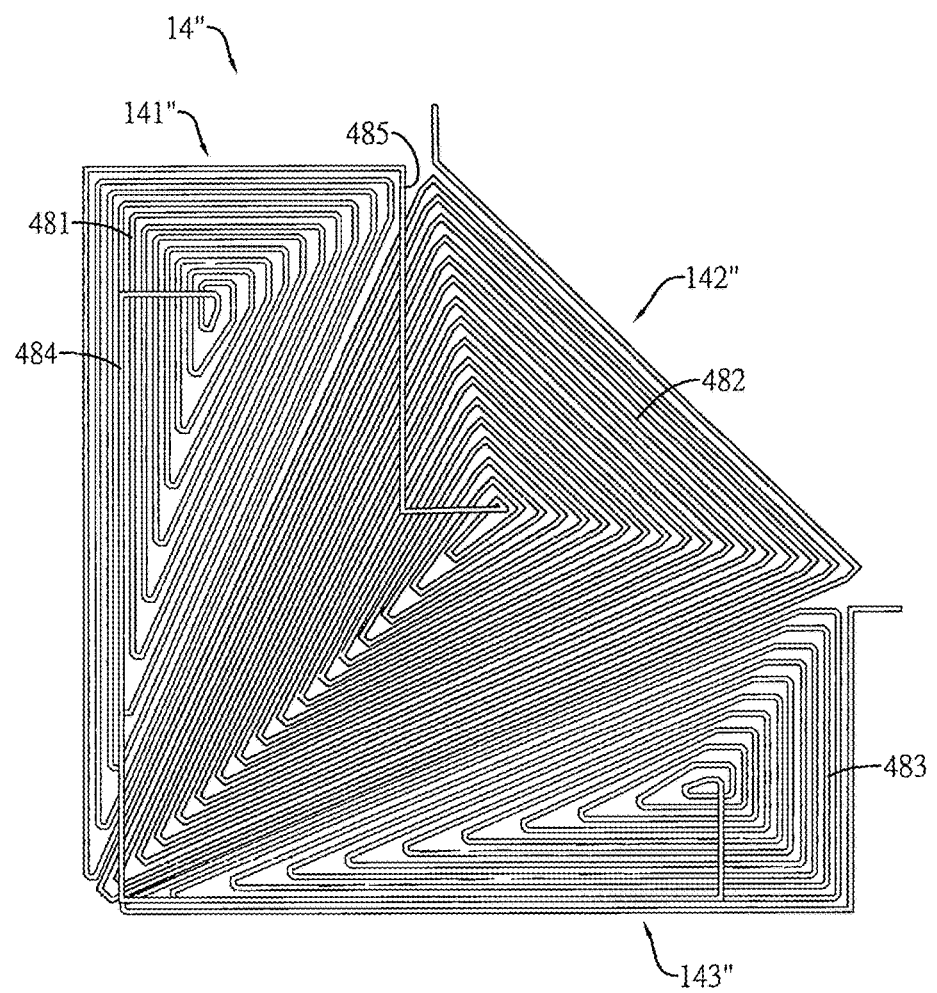
FIG. 10 is a schematic planar diagram showing a structure of a third embodiment of the FOD coil for detecting metallic foreign object in FIG. 3.

With reference to FIG. 10, a third embodiment of an FOD coil 14" in accordance with the present invention includes a first coil unit 141", a second coil unit 142" and a third coil unit 143". The second coil unit 142" is formed by winding a second wire 482 to generate a coiled isosceles triangle with a first leg and a second leg, and has an inner end and an outer end. The first coil unit 141" is formed by winding a first wire 481 to generate a coiled right triangle with a hypotenuse. The hypotenuse of the first coil unit 141" is external and parallel to the first leg of the second coil unit 142". The first coil unit 141' has an inner end and an outer end. The third coil unit 143" is formed by winding a third wire 483 to generate a coiled right triangle with a hypotenuse. The hypotenuse of the third coil unit 143" is external and parallel to the second leg of the second coil unit 142". The third coil unit 143" has an inner end and an outer end. The first coil unit 141", the second coil unit 142" and the third coil unit 143" are spaced apart from one another and the first coil unit 141", the second coil unit 142" and the third coil unit 143" as a whole are sector-shaped. The inner end of the first coil unit 141" is connected to an inner end of the third coil unit 143" through a first connection segment 484. The outer end of the first coil unit 141" is connected to the inner end of the second coil unit 142" through a second connection segment 485. The outer end of the second coil unit 142" is a current input (or output) terminal. The outer end of the third coil unit 143" is a current output (or input) terminal. Similar to the first embodiment, the first and second connection segments 484, 485 may be formed above the first, second and third wires 481, 482, 483 with an insulation layer formed between the first and second connection segments 484, 485 and the first, second and third wires 481, 482, 483. The first, second and third wires 481, 482, 483 may be formed on a top surface of a double-sided PCB and the first and second connection segments 484, 485 are formed on a bottom surface of the double-sided PCB. The first and second connection segments 484, 485 penetrate through vias formed through the double-sided PCB to respectively connect to the first, second third wires 481, 482, 483.

Figure 11:
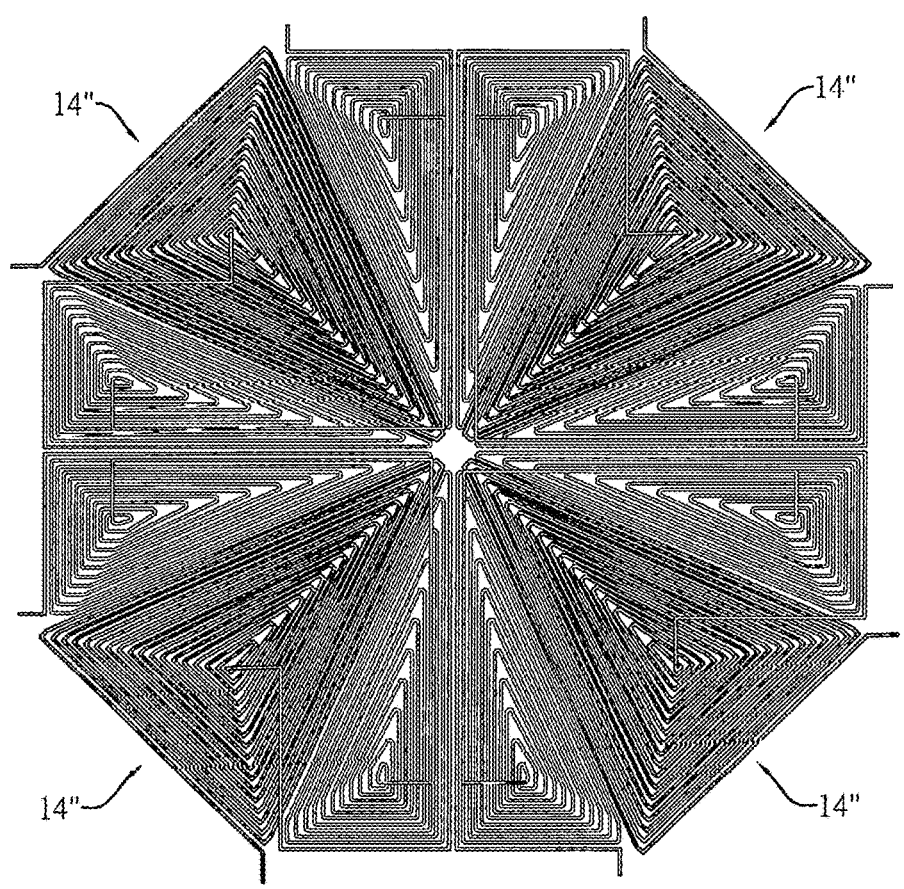
FIG. 11 is a schematic planar diagram showing a structure of a fourth embodiment of the FOD coil for detecting metallic foreign object in FIG. 3.

With reference to FIG. 11, the second insulating substrate has four FOD coils 14" as shown in FIG. 9. The four FOD coils 14" as a whole take the form of an octagon.

When the transmission antenna 13 transmits electromagnetic waves out, because all FOD coils 14', 14" are located within a radiation range of the electromagnetic waves, each FOD coil 14', 14" can sense the electromagnetic waves to generate a sensed signal Vsensor.

Figure 4:
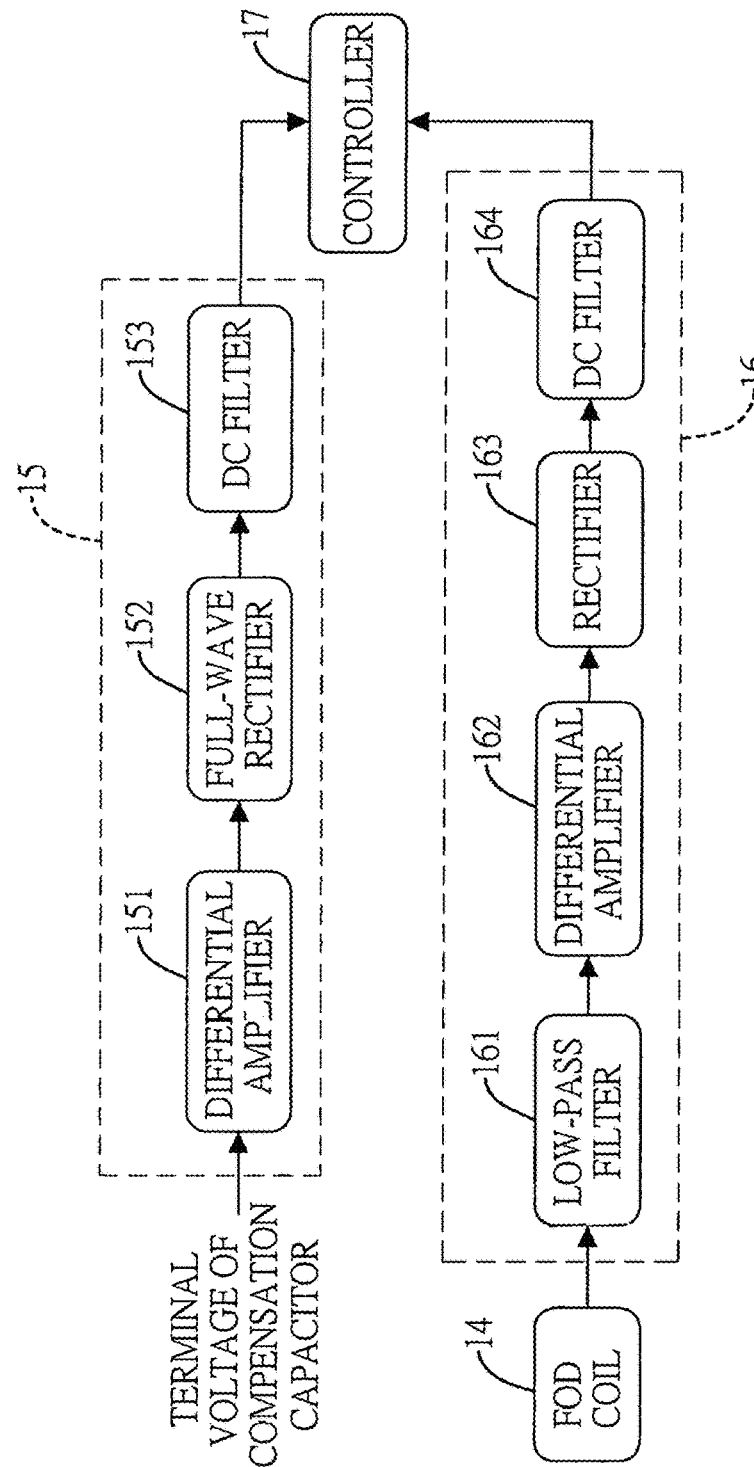
FIG. 4 is a functional block diagram of a reference voltage generation circuit, a controller and a feedback detection circuit of the wireless power transmission device in FIG. 3.

With further reference to FIGS. 1 and 3, the DC to AC converter 12 has multiple compensation capacitors connected in series to each other. The series-connected compensation capacitors Cp is electrically connected to the transmission antenna 13. Input terminals of the reference voltage generation circuit 15 are electrically connected to two ends of any compensation capacitor Cp to receive terminal voltages of the compensation capacitor Cp. With reference to FIG. 4, the reference voltage generation circuit 15 includes a differential amplifier 151, a full-wave rectifier 152 and a DC filter 153 connected in series to one another. An input terminal of the differential amplifier 151 is an input terminal of the reference voltage generation circuit 15. An output terminal of the DC filter 153 is an output terminal of the reference voltage generation circuit 15. Thus, the reference voltage generation circuit 15 performs differential amplification, full-wave rectification and DC filtering on the terminal voltages of the compensation capacitor Cp to generate a reference voltage signal Vref.

Each feedback detection circuit 16 corresponds to one of the multiple FOD coils 14 and an input terminal of feedback detection circuit is electrically connected to the FOD coil 14. The illustration in FIGS. 1 and 3 is given as an example with only one of the multiple feedback circuits 16 and the corresponding FOD coil 14. With reference to FIG. 4, each feedback detection circuit 16 includes a low-pass filter 161, a differential amplifier 162, a rectifier 163 and a DC filter 164 sequentially connected in series to one another. An input terminal of the low-pass filter 161 is the input terminal of the feedback detection circuit 16. An output terminal of the DC filter 164 is an output terminal of the feedback detection circuit 16. The feedback detection circuit 16 performs low-pass filtering, differential amplification, rectification and DC filtering on the sensed signal Vsensor generated by the corresponding FOD coil 14.

The controller 17 has multiple signal input terminals electronically connected to the output terminal of the reference voltage generation circuits 15 and the output terminal of the feedback detection circuits 16 to receive the reference voltage signal Vref and the multiple sensed signals Vsensor corresponding to the multiple FOD coils 14.

Figure 12:
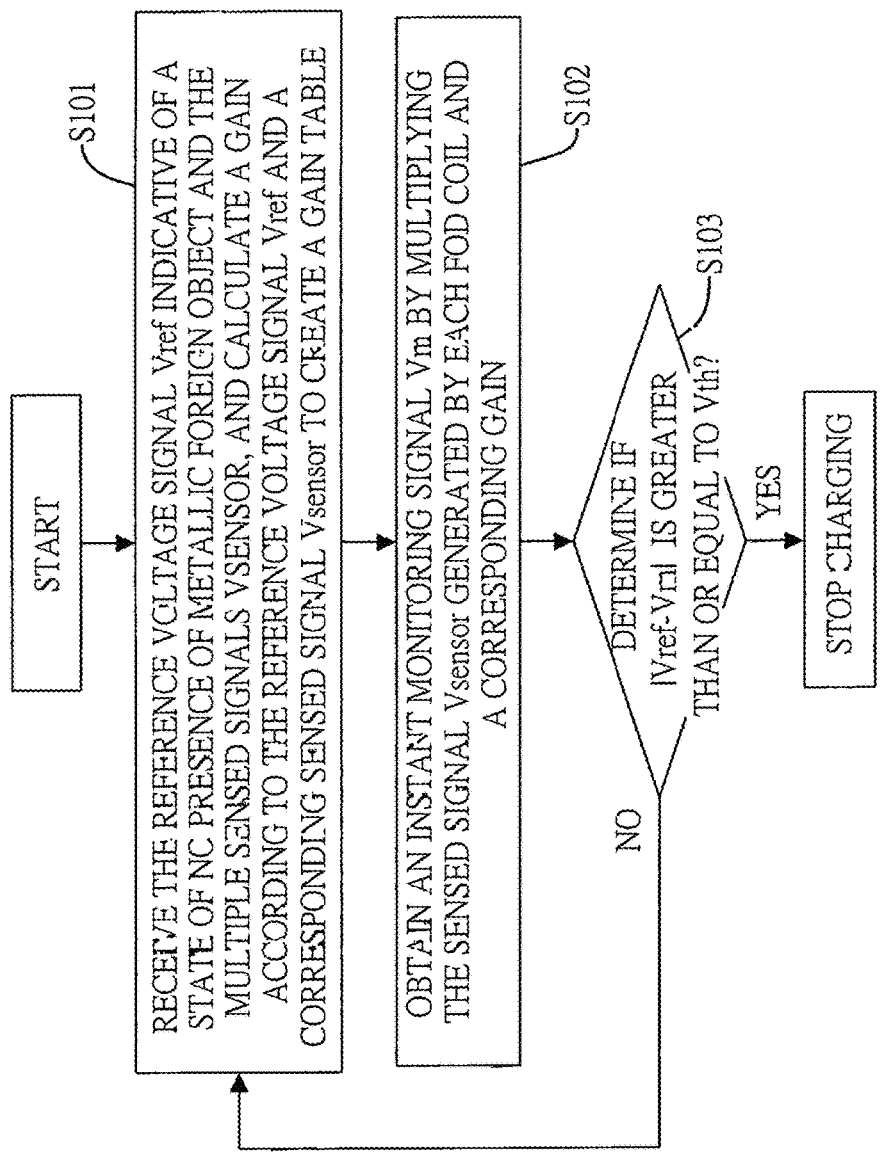
FIG. 12 is a flow diagram for the controller in FIG. 4 to determine the presence of any metallic foreign object.

With reference to FIGS. 1 and 12, prior to operation of the wireless power transmission device 10, users can inspect if there is any metallic foreign object found between the wireless power transmission device 10 and the receiving device 20. If any metallic foreign object is found, remove the metallic foreign object. In case of absence of any metallic foreign object, the controller 17 of the wireless power transmission device 10 performs a charging mode to control the transmission antenna 13 to start electromagnetic radiation. As located within the radiation range of electromagnetic waves, each FOD coil 14 can sense the electromagnetic waves to generate a sensed signal. The controller 17 initially receives the reference voltage signal Vref indicative of a state of no presence of metallic foreign object and the multiple sensed signals Vsensor, calculates a gain in association with each FOD coil 14 according to the reference voltage signal Vref and a corresponding sensed signal Vsensor, in which the gain is a ratio of the reference voltage signal Vref to a sensed signal of the corresponding FOD coil 14, i.e. Gain=Vref/Vsensor, and creates a gain table according to values of the gain for the FOD coils 14 (step S101). In other words, each FOD coil 14 has a corresponding gain in the gain table. The gain table can be stored in the controller 17.

After the gain table is created, upon the charging mode performed by the wireless power transmission device 10, the controller 17 continuously receives the sensed signals Vsensor of the FOD coils 14, obtains an instant monitoring signal Vm by multiplying the sensed signal Vsensor generated by each FOD coil 14 and a corresponding gain (step S102), and determines if a difference between the reference voltage signal Vref and the instant monitoring signal Vm corresponding to the FOD coil 14 (i.e. |Vref−Vm|) is greater than or equal to a threshold Vth (step S103).

When entering a region between the wireless power transmission device 10 and the receiving device 20, a metallic foreign object affects the electromagnetic field generated by the transmission antenna 13 and in turn affects the instant monitoring signal Vm corresponding to each FOD coil 14. Therefore, when the difference between the instant monitoring signal Vm and the reference voltage signal Vref is greater than the threshold Vth, the controller 17 determines that there is a metallic foreign object entering the region between the wireless power transmission device 10 and the receiving device 20 and further shuts down the wireless power transmission device 10 to stop the charging mode and effectively get rid of high heat arising from the effect of the magnetic field on the metallic foreign object. With further reference to FIG. 1, the wireless power transmission device 10 further includes a communication module 18 electrically connected to the controller to establish connection with a communication module of the receiving device 20. When determining that metallic foreign object is present, the controller 17 of the wireless power transmission device 10 sends out a control command to the communication module 23 of the receiving device 20 to stop charging. The controller 24 of the receiving device 20 then stops charging according to the control command.

Even though numerous characteristics and advantages of the present invention have been set forth in the foregoing description, together with details of the structure and function of the invention, the disclosure is illustrative only. Changes may be made in detail, especially in matters of shape, size, and arrangement of parts within the principles of the invention to the full extent indicated by the broad general meaning of the terms in which the appended claims are expressed.

What is claimed is:

1. A wireless power transmission device, comprising:
an alternating current (AC) to direct current (DC) converter having an input terminal to receive an AC power and convert the AC power into a DC power;
a DC to AC converter having:
an input terminal electrically connected to an output terminal of the AC to DC converter to convert the DC power into an AC output power; and
multiple compensation capacitors electrically connected to a transmission antenna to transmit the AC output power in the form of electromagnetic waves through the transmission antenna;
multiple foreign object detection (FOD) coils for detecting metallic foreign object mounted on an insulating substrate to sense the electromagnetic waves and generate multiple sensed signals, each FOD coil having three coil units connected in series to and spaced apart from one another, wherein a radiation pattern of the transmission antenna overlaps a sensing range of the FOD coils;
a reference voltage generation circuit having an input terminal electrically connected to the multiple compensation capacitors of the DC to AC converter to receive terminal voltages of any one of the multiple compensation capacitors and generate a reference voltage signal according to the terminal voltages of the compensation capacitor;
multiple feedback detection circuits electrically connected to the respective FOD coils, each feedback detection circuit receiving the sensed signal of a corresponding FOD coil; and
a controller electrically connected to the reference voltage generation circuit and the multiple feedback detection circuits to receive the reference voltage signal and the sensed signals corresponding to the multiple FOD coils and determine if any metallic foreign object enter a range of electromagnetic waves generated by the transmission antenna according to the reference voltage signal and the sensed signals.

2. The wireless power transmission device as claimed in claim 1, wherein the FOD coils are arranged on the insulating substrate in the form of a matrix, and each coil unit of a corresponding FOD coil has a center segment, a first segment, a second segment, a third segment, a fourth segment, a fifth segment and a sixth segment mounted on a surface of the insulating substrate, wherein
the center segment is U-shaped and has two ends, the first segment, the second segment and the third segment are mounted on the surface of the insulating substrate and are sequentially arranged outwards on a side of the center segment;

the third segment is electrically connected to one end of
the fifth segment, the other end of the fifth segment is
electrically connected to one end of the first segment
through a connection segment, the other end of the first
segment is electrically connected to one end of the
center segment through a bridging segment, the other
end of the center segment is electrically connected to
one end of the fourth segment through another connection segment, the other end of the fourth segment is
electrically connected to one end of the second segment
through another bridging segment, and the other end of
the second segment is electrically connected to one end
of the sixth segment through another connection segment; and the center segment, the first segment, the second segment,
the third segment, the fourth segment, the fifth segment
and the sixth segment to form the FOD coil with a
winding structure.

3. The wireless power transmission device as claimed in claim 1, wherein the FOD coils are arranged on the insulating layer in the form of a matrix, and each FOD coil has a first coil unit, a second coil unit and a third coil unit, wherein the second coil unit is formed by winding a second wire
to generate a coiled isosceles triangle with a first leg
and a second leg, and has an inner end and an outer end;

the first coil unit is formed by winding a first wire to
generate a coiled right triangle with a hypotenuse and
has an inner end and an outer end, wherein the hypotenuse of the first coil unit is external and parallel to the
first leg of the second coil unit;

the third coil unit is formed by winding a third wire to
generate a coiled right triangle with a hypotenuse and
has an inner end and an outer end, wherein the hypotenuse of the third coil unit is external and parallel to the
second leg of the second coil unit;

the inner end of the first coil unit is connected to an outer
end of the second coil unit through a first connection
segment, and the inner end of the second coil unit is
connected to the inner end of the third coil unit through
a second connection segment; and the first coil unit, the second coil unit and the third coil
unit are spaced apart from one another and the first coil
unit, the second coil unit and the third coil unit as a
whole are rectangular.

4. The wireless power transmission device as claimed in claim 1, wherein each FOD coil has a first coil unit, a second coil unit and a third coil unit, wherein the second coil unit is formed by winding a second wire
to generate a coiled isosceles triangle with a first leg
and a second leg, and has an inner end and an outer end;

the first coil unit is formed by winding a first wire to
generate a coiled right triangle with a hypotenuse and
has an inner end and an outer end, wherein the hypotenuse of the first coil unit is external and parallel to the
first leg of the second coil unit;

the third coil unit is formed by winding a third wire to
generate a coiled right triangle with a hypotenuse and
has an inner end and an outer end, wherein the hypotenuse of the third coil unit is external and parallel to the
second leg of the second coil unit;

the inner end of the first coil unit is connected to an inner
end of the third coil unit through a first connection
segment, and the outer end of the first coil unit is
connected to the inner end of the second coil unit
through a second connection segment; and the first coil unit, the second coil unit and the third coil
unit are spaced apart from one another and the first coil
unit, the second coil unit and the third coil unit as a
whole is sector-shaped.

5. The wireless power transmission device as claimed in claim 4, wherein the insulating substrate has four FOD coils taking the form of an octagon as a whole.

6. The wireless power transmission device as claimed one of claims 1 to 5, wherein when determining if there is any metallic foreign object,
the controller initially receives the reference voltage
signal indicative of a state of no presence of metallic
foreign object and the multiple sensed signals, calculates a gain in association with each FOD coil according to the reference voltage signal and a corresponding
sensed signal, and creates a gain table according to
values of the gain for the FOD coils, wherein the gain
is a ratio of the reference voltage signal to a corresponding FOD coil and the gain table can be stored in
the controller; and after the gain table is created, the controller continuously
receives the sensed signals of the FOD coils, obtains an
instant monitoring signal by multiplying the sensed
signal generated by each FOD coil and a corresponding
gain, and shuts down the wireless power transmission
device when determining that a difference between the
reference voltage signal and the instant monitoring
signal corresponding to the FOD coil is greater than or
equal to a threshold.

7. A foreign object detection (FOD) coil for detecting metallic foreign object formed with a single conductor on a planar insulating substrate, and comprising:

three coil units directly connected in series to and spaced
apart from one another, each of the three coil units
having a starting terminal and an ending terminal,
wherein the ending terminal of a first one of the three
coil units is directly connected to the ending terminal of
a second one of the three coil units, and the starting
terminal of a third one of the three coil units is directly
connected to the starting terminal of the second one of
the three coil units, wherein the starting terminal is the
input terminal of each of the three coil units and the
ending terminal is the output terminal of each of the
three coil units; and wherein the first one of the three coil units is wound in a
first direction such that the current flows in the first
direction, the second one of the three coil units is
wound in in an opposite direction such that the current
flows in the opposite direction from the first direction,
and the third one of the three coil units is wound in a
first direction such that the current flows in the first
direction; and two terminals, one of the two terminals being the starting
terminal of the first one of the three coil units and the
other terminal being the ending terminal of the third
one of the three coil units wherein each of the three coil units has a center segment,
a first segment, a second segment, a third segment, a
fourth segment, a fifth segment and a sixth segment
mounted on a surface of the insulating substrate;

wherein the center segment is U-shaped and has two ends,
the first segment, the second segment and the third
segment are mounted on the surface of the insulating
substrate and are sequentially arranged outwards on a
side of the center segment; the third segment is electrically connected to one end of the fifth segment, the other end of the fifth segment is electrically connected to one end of the first segment through a connection segment.

8. The FOD coil as claimed in claim 7, wherein the other end of the first segment is electrically connected to one end of the center segment through a bridging segment, the other end of the center segment is electrically connected to one end of the fourth segment through another connection segment, the other end of the fourth segment is electrically connected to one end of the second segment through another bridging segment, and the other end of the second segment is electrically connected to one end of the sixth segment through another connection segment; and the center segment, the first segment, the second segment, the third segment, the fourth segment, the fifth segment and the sixth segment to form a winding structure as a whole.

9. The FOD coil as claimed in claim 7, wherein the three coil units include a first coil unit, a second coil unit and a third coil unit, and each of the first coil unit, the second coil unit and the third coil unit has the starting terminal and the ending terminal, wherein
- the second coil unit is formed by winding a second wire to generate a coiled isosceles triangle with a first leg and a second leg, and has an inner end and an outer end being the ending terminal and the starting terminal of the second coil unit respectively;
- the first coil unit is formed by winding a first wire to generate a coiled right triangle with a hypotenuse and has an inner end and an outer end being the ending terminal and the starting terminal of the first coil unit respectively, wherein the hypotenuse of the first coil unit is external and parallel to the first leg of the second coil unit;
- the third coil unit is formed by winding a third wire to generate a coiled right triangle with a hypotenuse and has an inner end and an outer end being the ending terminal and the starting terminal of the third coil unit respectively, wherein the hypotenuse of the third coil unit is external and parallel to the second leg of the second coil unit;
- the inner end of the first coil unit is connected to an outer end of the second coil unit through a first connection segment, and the inner end of the second coil unit is connected to the inner end of the third coil unit through a second connection segment; and
- the first coil unit, the second coil unit and the third coil unit are spaced apart from one another and the first coil unit, the second coil unit and the third coil unit as a whole are rectangular.

10. The FOD coil as claimed in claim 7, wherein the three coil units include a first coil unit, a second coil unit and a third coil unit, and each of the first coil unit, the second coil unit and the third coil unit has the starting terminal and the ending terminal, wherein
- the second coil unit is formed by winding a second wire to generate a coiled isosceles triangle with a first leg and a second leg, and has an inner end and an outer end being the ending terminal and the starting terminal of the second coil unit respectively;
- the first coil unit is formed by winding a first wire to generate a coiled right triangle with a hypotenuse and has an inner end and an outer end being the ending terminal and the starting terminal of the first coil unit respectively, wherein the hypotenuse of the first coil unit is external and parallel to the first leg of the second coil unit;
- the third coil unit is formed by winding a third wire to generate a coiled right triangle with a hypotenuse and has an inner end and an outer end being the ending terminal and the starting terminal of the third coil unit respectively, wherein the hypotenuse of the third coil unit is external and parallel to the second leg of the second coil unit;
- the inner end of the first coil unit is connected to an inner end of the third coil unit through a first connection segment, and the outer end of the first coil unit is connected to the inner end of the second coil unit through a second connection segment; and
- the first coil unit, the second coil unit and the third coil unit are spaced apart from one another and the first coil unit, the second coil unit and the third coil unit as a whole is sector-shaped.

* * * * *